(12) United States Patent
Vu

(10) Patent No.: US 7,496,898 B1
(45) Date of Patent: Feb. 24, 2009

(54) ERROR ANALYSIS AND DIAGNOSIS FOR GENERIC FUNCTION CALLS

(75) Inventor: Calvin H. Vu, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 628 days.

(21) Appl. No.: 10/826,243

(22) Filed: Apr. 15, 2004

(51) Int. Cl.
  *G06F 9/44* (2006.01)
  *G06F 9/45* (2006.01)
  *G06F 11/00* (2006.01)

(52) U.S. Cl. .............. 717/127; 717/131; 717/141; 717/143; 714/38; 714/39

(58) Field of Classification Search .................. None
  See application file for complete search history.

(56) References Cited

U.S. PATENT DOCUMENTS 5,355,354 A * 10/1994 Matsumoto et al. ...... 369/13.52
5,535,329 A * 7/1996 Hastings ...................... 714/35
5,574,854 A * 11/1996 Blake et al. .................. 714/28
5,745,675 A * 4/1998 Herbig et al. ................ 714/38

* cited by examiner

Primary Examiner—Chuck O Kendall
(74) Attorney, Agent, or Firm—Osha • Liang LLP (57) ABSTRACT

A method and computer program product for detecting and diagnosing errors in a generic function call and then presenting them in an error message is disclosed. A generic function call is provided for evaluation. A corresponding generic function definition containing sets of dummy arguments that define arguments signatures for associated specific functions is also provided. In a first sorting the generic function call is compared with the argument signatures to determine whether the generic function call contains errors. A second sorting is then used to determine the nature of the errors. An error message describing the nature of the errors is then generated.

18 Claims, 4 Drawing Sheets

|   | | $Arg_1$ | $Arg_2$ | $Arg_3$ | $Arg_4$ |
|---|---|---|---|---|---|
| $T_1$ | $n_1$ | ARR (Integer) | — | — | — |
| | $n_2$ | ARR (Real) | — | — | — |
| | $n_3$ | ARR (Complex) | — | — | — |
| $T_2$ | $n_4$ | ARR (I) | DIM | — | — |
| | $n_5$ | ARR (R) | DIM | — | — |
| | $n_6$ | ARR (C) | DIM | — | — |
| $T_3$ | $n_7$ | ARR (I) | MASK | — | — |
| | $n_8$ | ARR (R) | MASK | — | — |
| | $n_9$ | ARR (C) | MASK | — | — |
| $T_4$ | $n_{10}$ | ARR (I) | DIM | MASK | — |
| | $n_{11}$ | ARR (R) | DIM | MASK | — |
| | $n_{12}$ | ARR (C) | DIM | MASK | — |
| $T_5$ | $n_{13}$ | ARR (C) | DIM | MASK | MASK (S, R) |
| | $n_{14}$ | ARR (C) | DIM | MASK | MASK (A, L) |

*Fig. 1(a)*

|       | $Arg_1$ | $Arg_2$ | $Arg_3$ | $Arg_4$ |
|-------|---------|---------|---------|---------|
| $n_{21}$ | X | X | X | <u>1</u> |
| $n_{22}$ | X | X | X | <u>1</u> |
| $n_{23}$ | X | X | X | <u>1</u> |

110

|       | $Arg_1$ | $Arg_2$ | $Arg_3$ | $Arg_4$ |
|-------|---------|---------|---------|---------|
| $n_{31}$ | X | X | — | X |
| $n_{32}$ | X | X | X | — |

120

|       | $Arg_1$ | $Arg_2$ | $Arg_3$ | $Arg_4$ |
|-------|---------|---------|---------|---------|
| $n_{41}$ | X | X | X | <u>1</u> |
| $n_{42}$ | X | X | X | <u>2</u> |
| $n_{43}$ | X | X | X | <u>1</u> |

130

|       | $Arg_1$ | $Arg_2$ | $Arg_3$ | $Arg_4$ |
|-------|---------|---------|---------|---------|
| $n_{51}$ | X | — | — | — |
| $n_{52}$ | X | X | — | — |
| $n_{53}$ | X | X | X | — |
| $n_{54}$ | X | — | X | — |

ERROR ANALYSIS AND DIAGNOSIS FOR GENERIC FUNCTION CALLS

BACKGROUND

In common usage today are computer executable functions whose exact mode of operation can vary depending on the nature of the parameters specified by the function. If parameters of one type are input into, and defined for, the function then one operation is performed by the function. Whereas, if a different set of specified parameters are input and defined for the function, then a different operation is performed by the function. Such functions are commonly referred to as generic function calls. A generic function call is a function consisting of a set of methods with a common calling protocol. A generic function computes its value by selecting and calling an appropriate method based on the types of the arguments. Developers can use these generic function calls to conveniently accomplish a vast array of programming tasks.

Each parameter of a generic function is similarly associated with its own set of distinctive requirements. Each generic function call has associated therewith a parameter list that includes, among other things, all the data characteristics (e.g., types, kinds, ranks, etc.) for each parameter of the generic function call. This list defines a "signature" for the specific function. Although disclosed generically here, the principles of the present invention are intended to be broadly applied to all other programming languages that use generic function calls. Other examples include, without limitation, Fortran generic functions and overloaded function templates in C++ and Java, which are sometimes referred to as ad-hoc polymorphic routines.

When a developer compiles a piece of code that calls a generic function, the compiler compares the function used by the developer with a parameter list associated with that function. The compiler will try to match the function call with a specific function with the same signature. The process of matching a function call with a corresponding specific function, or method, is called "overloading resolution". An error can be detected by the compiler when the overloading resolution cannot find a matching specific function or method. Commonly, since it is not possible to know the intended specific function desired by the programmer, when an error in a generic function call is detected, it is reported by a message such as "No specific function exists" or "There is no matching function". Details, such as the cause or mode of failure for the generic function call are not provided in conventional technologies.

Although, from this example, it might seem that it would be fairly simple to identify and diagnose the errors in generic function calls, the reader is reminded that the above-mentioned generic function is a very simple example. In other cases, the compilation can result in dozens other error messages. Sorting through each message and individually diagnosing the problem in this manner can be a time-consuming process. Additionally, generic functions can be overloaded with many user-defined functions. Such user-defined generic functions can have an arbitrary number of parameters and are much more complex than the simple intrinsic generic function previously discussed.

SUMMARY

In accordance with the principles of the present invention, methodologies and apparatus for detecting and identifying the nature of errors for generic function calls are disclosed.

In one embodiment, the invention contemplates a method for detecting and analyzing errors in a generic function call. Such method involves providing a generic function call that can invoke a plurality of different specific functions. The specific functions being determined by the specific parameters selected for the generic function call. A determination is made as to whether the generic function call contains errors. When errors are found the nature of the errors is identified. An error message is provided that includes information about the nature of the errors.

In one embodiment, the invention contemplates a method for detecting and analyzing errors in a generic function call. Such method involves providing an generic function call for analysis, this generic function call can invoke a plurality of different specific functions which can be varied by selecting different parameters of the generic function call. The method includes determining whether the generic function call contains errors and identifying the nature of the errors. An error message that includes information about the failure mode that caused the errors in the generic function call is provided.

In another method embodiment, a relation is provided that defines the generic function call in terms of dummy arguments representative of specific functions defined for the generic function call. Each specific function defined for a generic function call includes a set of dummy arguments that define an argument signature representative of that specific function. A first sorting is applied to the relation thereby comparing the generic function call with the dummy arguments of the relation. If the generic function call correctly matches a format for one of the argument signatures of the relation, the generic function call is deemed to have no error. If the generic function call does not correctly match an argument signature for any of the specific functions, the generic function call is deemed to have an error. The error is further clarified by recognizing that the first sorting has determined that an error is present in the generic function call and a second sorting through the relation is conducted to determine the failure mode. An error message including information about the failure mode determined by the second sorting is then provided.

In another embodiment, a computer readable media including computer program code for detecting and analyzing errors a generic function call is disclosed. The computer readable media includes code for providing a generic function call for analysis. The generic function call can invoke a plurality of different specific functions which can be varied by selecting different parameters of the generic function call. The computer readable media includes computer code for determining whether the generic function call contains an error and identifying the nature of the error. The computer readable media also includes code for providing an error message that includes information about the failure mode that caused the error in the generic function call.

A tool that can help identify the nature of specific defects in a generic function call would be very useful to a developer or user. Currently, there are no suitable techniques or tools for identifying and presenting errors in a generic function call to a user in other than a generalized (and not particularly helpful) way. For example, conventional error diagnosis tools do not identify the defective (or improperly formatted) parameters or identify erroneous types in generic function call error messages. Therefore, in view of the clear deficiencies of conventional techniques, there exists a need for a method for identifying defects in generic function calls and providing more information about the nature of such defects in an error message. These and other aspects of the present invention are described in greater detail in the detailed description set forth herein.

BRIEF DESCRIPTION OF THE DRAWINGS

The following detailed description will be more readily understood in conjunction with the accompanying drawings, in which.

It is to be understood that, in the drawings, like reference numerals designate like structural elements. Also, it is understood that the depictions in the Figures are not necessarily to scale.

DETAILED DESCRIPTION OF THE DRAWINGS

The present invention has been particularly shown and described with respect to embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

Embodiments of the invention include tools and methods for identifying that defects are present in a generic function call and identifying the nature of the specific defects found in the defective generic function call (thereby identifying the failure mode that caused the generic function call to fail). Importantly, the embodiments of the invention are configured to take a minimum amount of processing time. No detailed error analysis is performed until it is determined that an error is present in the generic function call. Thus, for correctly formatted generic function calls, no additional processing time is spent. Additionally, embodiments are configured to detect defects and provide an error message that provides detailed error information where possible. In particular the error message is configured so that it does not mislead a user even when the embodiment cannot identify the precise specific function the user intended. Thus, embodiments should be configured to analyze a generic function call in a manner that enables non-misleading error information to be obtained without significantly increasing the processing time over that which would have been required to analyze a correctly-written generic function call. In other words, embodiments of the invention can be configured to analyze a defective function call without a substantial performance penalty. Additionally, some embodiments can be configured to provide a detailed error message containing as much information as possible without knowing which specific function the user intended.

These conflicting criteria illustrate the shortcomings of existing tools which provide correct, but extremely vague, error messages. As alluded to above, conventional error diagnosis tools do not identify the incorrect parameters or identify the kind of error in the generic function call error messages.

The following detailed description describes various embodiments for error detection and defect diagnosis methodologies and approaches. The following detailed description describes various embodiments for evaluating generic function calls. In accordance with one embodiment of the invention a method for detecting and analyzing errors in generic function calls and providing a detailed error message is disclosed. Such an embodiment begins by determining whether a generic function call contains errors. Once the process determines there are errors, information concerning the nature of the error can be determined and provided to the user in the form of a detailed error message.

As used herein "generic function calls" are computer executable instructions that are configured to invoke a plurality of different "specific functions" or "methods". The precise operation of the "specific function" depends upon the parameters (also called arguments) of the generic function call. The principles of the present invention can be readily applied to any forms of computer executable instructions that use generic functions. Although not limited to such, examples of such functions can include, but are not limited to overloaded function templates or polymorphic routine dynamic binding in object-oriented languages such as C++ and Java.

Figure 1A:
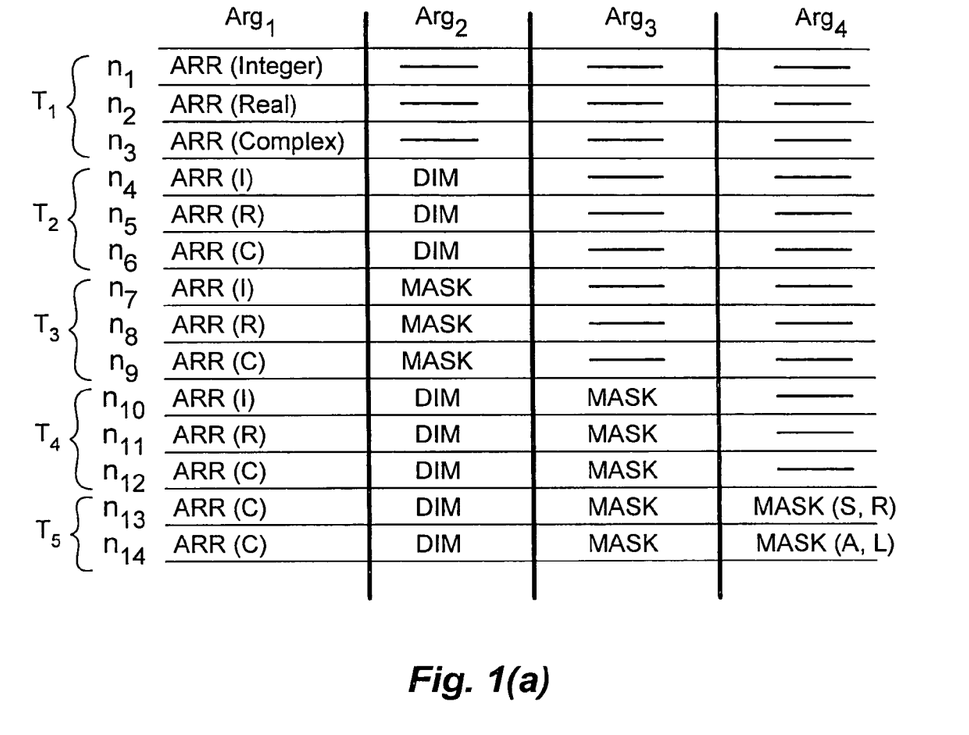
FIG. 1(a) is a simplified schematic diagram illustrating one embodiment of a relation containing a plurality of dummy arguments representative of the specific functions defined for a generic function call constructed in accordance with the principles of the invention.

In illustrating certain principles of the invention, reference is hereby made to FIG. 1(a). FIG. 1(a) is a schematic depiction of a relation that describes a relationship between the parameters associated with a generic function. Such a relation is commonly referred to a generic function definition. Such a generic function definition is a listing of all of the specific functions defined for the generic function call. Additionally, each of the parameters required to enable each specific function is listed as a part of a set of dummy arguments for that specific function. As explained above, that set of dummy arguments defines the argument signature for that specific function. As depicted here the generic function definition is arranged as a matrix of dummy arguments representative of the generic function call. FIG. 1(a) illustrates one example of a relation that defines the relationship between a generic function call, its specific functions, and the parameters used to define the specific functions. This relation can be express in a number of different formats including many that are known to persons having ordinary skill in the art. In one embodiment, the relation comprises a matrix of dummy arguments and their related specific functions arranged in a relationship with the associated parameters. FIG. 1(a) illustrates an example of such a matrix in the form of a "SUM" function (depicted here as modified with a few added user defined specific functions). Although certain principles of operation are disclosed with respect to the following example, the principles of the present invention can be applied to any other generic function call configured in any computer language that utilizes similar generic function calls. In particular, embodiments of the invention can operate on function templates that are overloaded with user-defined functions.

Returning to FIG. 1(a), a simplified schematic depiction of a generic function definition 100 is depicted. The generic function definition 100 is depicted as a parameter matrix including a listing of all specific functions ($n_1 \ldots n_4$) defined for the generic function call. Each parameter required to define a properly formatted specific function is included in the generic function definition 100. The depicted generic function definition 100 is a SUM function that includes a few user-defined specific functions (e.g., $n_{13}$, $n_{14}$). The depicted SUM function can include many templates that define general implementations for the generic function call. Examples of four general templates are shown as follows: SUM (ARRAY) $T_1$, SUM (ARRAY, MASK) $T_2$, SUM (ARRAY, DIM) $T_3$, SUM (ARRAY, DIM, MASK) $T_4$, or a template $T_5$ for a few user defined functions ($n_{13}$, $n_{14}$). In the illustrated case, these templates define 14 specific functions ($n_1$, $n_2$, $n_3$, ... $n_{14}$) depending on the actual arguments (parameters) in the function calls. Examining $T_1$, for example, 3 different specific functions ($n_1$, $n_2$, $n_3$) are defined, all of these specific functions implementations require a single parameter ARRAY and do not require any other parameters. This first parameter (also referred to as an argument) is identified as $Arg_1$. However, in this depicted example, the first $Arg_1$ argument can be one of three different types: integer, real, or complex. Thus, one type of ARRAY will be compatible with the intended function, others will not. So as depicted here a dummy argument corresponds to the set of parameters that enable a specific function. For example a dummy argument corresponding to specific function $n_{10}$ is configured to include ARRAY (of type integer), a dimension (DIM) parameter, and a mask (MASK) parameter. Details of such configuration will be further elucidated below.

The inventor points out that the depicted generic function definition is a very simplified expression of the true nature of most generic function definitions. For example, the format of a parameter (e.g., $Arg_1$) of type ARRAY commonly includes a dimension (or rank) component. Thus, in one embodiment the ARRAY can be configured to require a rank of 1 to 7 (a rank of zero being a scalar, a rank of two defining a two dimensional array, and so on). Moreover, each "type" (e.g., REAL or COMPLEX) can be configured with single-, double-, or quad-precision, etc. Additionally, a compiler can also support many different types of INTEGER. Therefore, there can be 70 or more different specific functions for a single argument ARRAY of different types and ranks, and not just three as depicted in FIG. 1. It is this very high degree of flexibility in defining a specific function that results in difficulty in diagnosing an error. Thus, not only is a user faced with identifying that an error has occurred in a generic function call, but figuring out the nature of this error can be an extraordinarily time consuming process. However, for purposes of illustration the simplified generic function definition of FIG. 1(a) will be used make embodiments of the invention easier to explain.

Continuing, the depicted specific implementations $n_1$, $n_2$, $n_3$ of the template $T_1$ are defined as having only one argument $Arg_1$ (comprising an ARRAY) and no second argument $Arg_2$ or third argument $Arg_3$. $T_2$ and $T_3$ templates define additional specific functions ($n_4$, $n_5$, $n_6$, $n_7$, $n_8$, $n_9$) that also require the first parameter $Arg_1$ to be an array of type integer, real, or complex (again bearing in mind the simplifications described above). Additionally, the second parameter $Arg_2$ can be a dimension parameter DIM or a MASK parameter. The DIM parameter can be a scalar of type integer, with a value $1 \leq DIM \leq n$ where n is the rank of ARRAY. The MASK parameter is of type logical and conformable with ARRAY (i.e. $Arg_1$). Thus, the function template $T_2$ comprises specific functions $n_4$, $n_5$, $n_6$ that are defined by an ARRAY first argument $Arg_1$ and a DIM second argument $Arg_2$ and no third argument $Arg_3$. The third template $T_3$ comprises specific functions $n_7$, $n_8$, $n_9$ that are defined by an ARRAY first argument $Arg_1$ and a MASK second argument $Arg_2$ and no third argument $Arg_3$.

Also, $T_4$ defines three specific functions ($n_{10}$, $n_{11}$, $n_{12}$) that require the first parameter $Arg_1$ to be an ARRAY formatted as above (e.g., one of three types: integer, real, or complex). The second parameter $Arg_2$ can be a dimension parameter DIM formatted as a scalar (rank zero), of type integer, with a value $1 \leq DIM \leq n$ where n is the rank of ARRAY. Additionally, a third argument $Arg_3$ can be a MASK parameter of type logical and conformable with the ARRAY (of $Arg_1$).

Additionally, $T_5$ defines a pair of user-defined specific functions ($n_{13}$, $n_{14}$) configured with a first parameter $Arg_1$ to be an ARRAY formatted as above (e.g., one of three types: integer, real, or complex). The second parameter $Arg_2$ can be a dimension parameter DIM formatted as a scalar, of type integer, with a value $1 \leq DIM \leq n$ where n is the rank of ARRAY. A third argument $Arg_3$ can be a MASK parameter of type logical and conformable with the ARRAY (of $Arg_1$). Also, a fourth argument is configured in one case (that of $n_{13}$) to be a MASK parameter of rank scalar (S) and type real (R) and in another case (that of $n_{14}$) to be a MASK parameter of rank array (S) and type logical (R).

Thus, as depicted in FIG. 1(a) a generic function definition 100 for the depicted generic function call is presented as a parameter matrix that indicates all the permissible specific functions defined for the generic function call. Here, each of these specific functions is represented by an associated set of dummy arguments that define all the permissible permutations of the parameters (i.e., the argument signatures) that can be used the indicated generic function call. As stated previously, the principles of the invention as applied to the depicted generic function definition can be applied to virtually any programming language having generic function calls. Such implementations include, without limitation, Fortran, C++, Java, as well as other such programming languages. Using Fortran as an example, an example generic function call is the SUM intrinsic function in the Fortran programming language. The SUM function in the Fortran programming language is defined by a number of different parameters. For example, the SUM function can used in four different ways, SUM (ARRAY), SUM (ARRAY, MASK), SUM (ARRAY, DIM), or SUM (ARRAY, DIM, MASK). Each of these four parameter configurations defines a different class of "specific function" or function template. As is known to persons having ordinary skill in the art, the SUM function can be used to do the summation operation on a variety of arrays in different ways. Also, as is known to persons or ordinary skill, each of the parameters (here ARRAY, DIM, and MASK) each have specific data characteristics that conform to the format of the programming language involved. This principle is briefly illustrated using the following generalized example. For example, in Fortran, an ARRAY parameter must be formatted using "types", "kinds", "ranks", as well as other data characteristics compatible with the FORTRAN programming language. The nature of such data characteristics are known to persons having ordinary skill in the art. For example, "type" indicates data characteristics including INTEGER, REAL, and COMPLEX (as well as other related allowable data types). A "kind" can be used to indicate a size characteristic for a parameter (e.g., a REAL(KIND=4) can specify a 4-byte floating point number or COMLEX (KIND=16) can specify a 16 byte complex value). A "rank" can be used to specify a dimension for a parameter. For example a "rank" of zero can indicate a scalar and a rank of two can indicate a two-dimensional array data structure. Those of ordinary skill in the art are well aware of the nature and use of such data characteristics used to correctly format computer program instructions.

Embodiments of the invention compare the actual arguments (those that are in the generic function call being analyzed by the embodiments of the invention) and the dummy arguments of the generic function definition to detect and evaluate errors in a generic function call. Moreover, implementations of the invention can use such relations to determine best-fit matches to determine the most likely causes of failure for the generic function call. The cause of failure is also referred to herein as the nature of the error or the failure mode for the generic function call. Such, cause of failure information can be used to identify which argument failed or the precise nature of the failure. This information can be formulated into an error message which can be used by user to identify and correct such errors.

Figure 2:
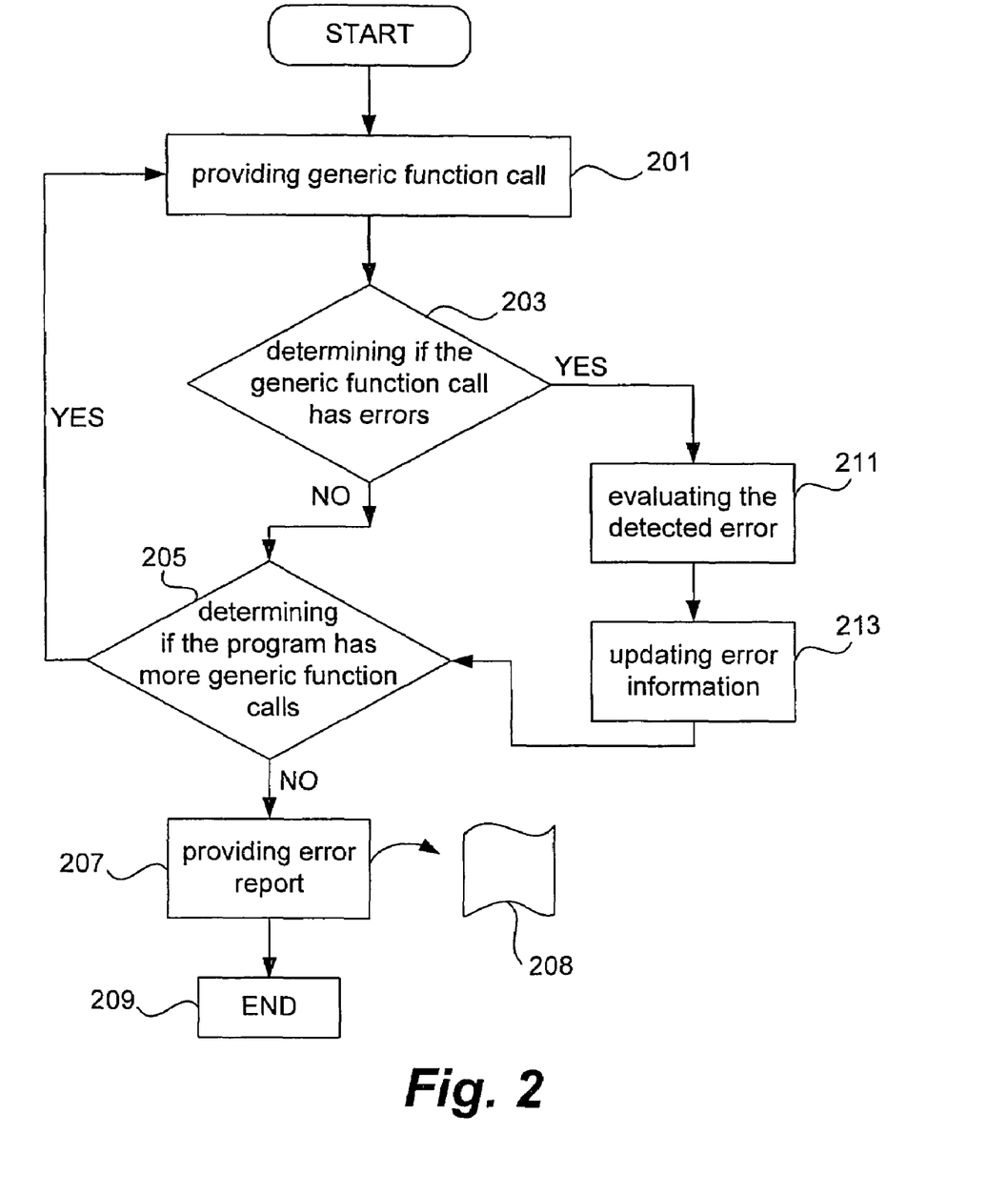
FIG. 2 is a flow diagram illustrating aspects of a methodology for detecting and diagnosing errors in a generic function call in accordance with the principles of the invention.

FIG. 2 is a simplified flow diagram 200 that can be used to illustrate aspects of the invention. A program or other piece computer readable code is provided for analysis (Step 201). Each generic function call in the code is compared with a generic function definition for that generic function call. It is then determined if there is an error in the generic function call (Step 203). If no error is found, the generic function call is considered operational and the program determines if there are further generic function calls needing analysis (Step 205). Where further generic function calls require analysis the process returns to Step 201. Returning to Step 203, where an error is found in the generic function call, further analysis can be used to determine an error analysis pattern that can be used to obtain additional error information if possible (Step 211). All error information obtained in Steps 203 and 211 are then used to update error information 213. Once a generic function calls in the code are examined, an error message 208 is provided (Step 207) and the process ends.

Further explanation follows. A piece of code is provided for analysis (Step 201). The code is examined for generic function calls. These are identified and generic function call is then compared with a relation between the generic function call, specific functions, and associated parameters to determine the presence of an error in the generic function call. Commonly, the relation comprises a generic function definition which is a tabular representation for the appropriate generic function call. However, other relations can be used. FIG. 1(a) schematically depicts a simplified example of one embodiments of a generic function definition 100. Tables such as that depicted in FIG. 1(a) provide one satisfactory relation for conducting error analysis in accordance with the principles of the invention. In one embodiment, the process efficiently sorts through the dummy arguments of an argument signature for each specific function of the generic function call. As soon as the process encounters a parameter having the wrong format, it discerns a mismatch and skips to the next argument signature. Thus, large batches of dummy arguments (an argument signatures) can be sorted through in a minimum time. Once the generic function call is matched correctly with an argument signature, it is determined to be correct and the next generic function call is analyzed. At this stage only error detection is sought. In this way no time is wasted seeking the failure mode for the function. Failure mode analysis is not performed until all of the argument signatures for the generic function call fail. Thus, no time is wasted excessively analyzing correctly formatted generic function calls.

Figure 1B:
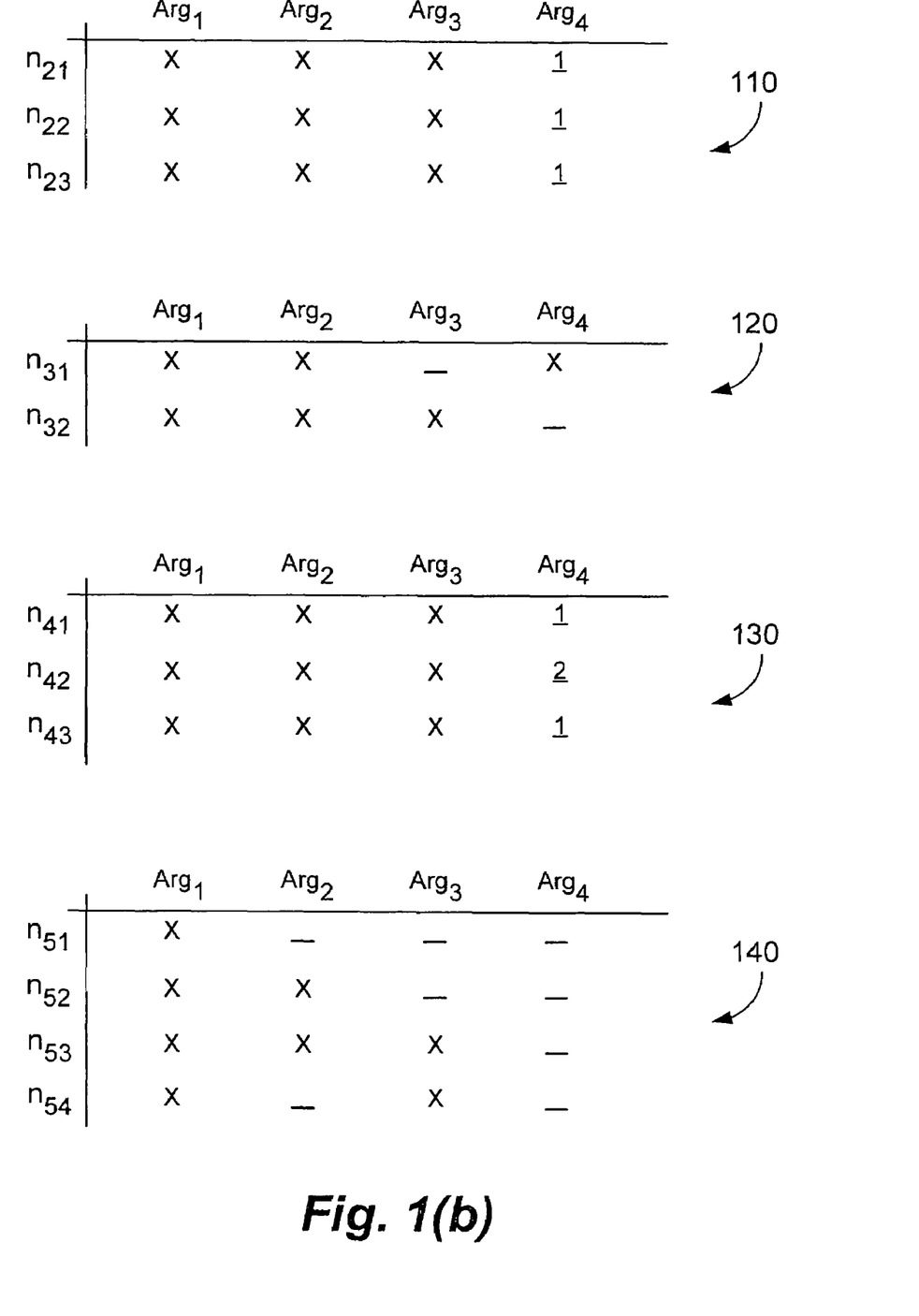
FIG. 1(b) is a simplified schematic diagram illustrating several different error analysis patterns that can be used to clarify a diagnosis for a mode of failure for a generic function call in accordance with the principles of the invention.

FIG. 1(b) is a schematic representation of an error analysis pattern achieved after a generic function call is compared with a generic function definition associated with the generic function call. A pattern of matches and mismatches are generated by such comparison to generate an error analysis pattern. The depiction is very schematic with X's marking matches between the programmed parameters of the generic function call and the parameters of associated dummy arguments. Also, "_" is used to represent mismatches between the generic function call and the parameters of associated dummy arguments. Also, a number is used to figuratively describe a specific mode of failure for each mismatch. For example, a $\underline{1}$ describes a first failure mode and a $\underline{2}$ describes a second failure mode of a type different from the first failure mode.

Referring again to FIG. 1(b) a few generalized examples are discussed. In a first relation 110 is expressed as a generic function definition for a generic function call. A first sorting identifies that the generic function call cannot be matched to any of the argument signatures associated with the generic function definition. This is illustrated by the fact that each of the fourth arguments $Arg_4$ fails. A second sorting of the generic function definition indicates that all of the dummy arguments fail at the fourth argument $Arg_4$. Additionally, the second sorting identifies that the fourth argument $Arg_4$ fails in accordance with the same failure mode (e.g., $\underline{1}$). Thus, an error message concerning the generic function call can identify that there is an error for that generic function call, can identify that the fourth argument is the cause of the failure, and can identify the mode of failure in the fourth argument. For example, it can identify that the fourth argument failed because it had the wrong "type", "rank", "kind" or other formatting issue mis-specified.

Another case is illustrated at 120 of FIG. 1(b). In the indicated case, the first sorting also identifies that the generic function call does not match any of the argument signatures. This is illustrated by the fact that for each of the signatures at least one of the dummy arguments fails. For example, the signature for specific function $n_{31}$ fails as to the third argument $Arg_3$. And also the signature for specific function $n_{32}$ fails as to the fourth argument $Arg_4$. The second sorting will reveal no agreement as to the mode of failure regarding the generic function call. All that can be determined is that $Arg_3$ or $Arg_4$ failed. Thus, an error message concerning the generic function call can identify only that there is an error present in the generic function call but no further detail. The parameter that failed or the specific mode of failure cannot be identified with this error analysis pattern.

Again referring to FIG. 1(b) another example is discussed. Another relation 130 is expressed as a generic function definition for a generic function call. A first sorting identifies that the generic function call does not match with any of the argument signatures. This is illustrated by the fact that for each of the argument signatures, the dummy argument corresponding to the fourth argument $Arg_4$ fails. A second sorting of the generic function definition indicates that all of the dummy arguments fail at the fourth argument $Arg_4$. Importantly, the second sorting identifies that the fourth argument $Arg_4$ fails in accordance with different failure modes (e.g., $\underline{1}$ and $\underline{2}$). Thus, an error message concerning the generic function call can identify that there is an error and can identify that the fourth argument is the cause of the failure. However, the precise mode of failure in the fourth argument is indeterminate. For example, the fourth argument may have failed for specific functions $n_{41}$, $n_{43}$ as a "rank" failure and failed as to specific function $n_{42}$ as a "kind" failure. Thus, the error message could identify the mode of failure as $Arg_4$, but it could not specify further causation information.

In one embodiment, a first sorting identifies whether an error is present in a generic function call. A second sorting defines an error analysis pattern for the generic function call that identifies all the various failure patterns when compared to the associated generic function definition. The error analysis pattern is analyzed to further clarify the nature of the error. For example, the error analysis pattern can be used to identify the argument signature having the most correct matches with the generic function call. For example, referring to 140 of FIG. 1(b) argument signatures for four specific functions ($n_{51}$, $n_{52}$, $n_{53}$, $n_{54}$) are schematically depicted. Each argument signature suffers a failure for a different reason. Using the depicted error analysis pattern it is demonstrated that the argument signature associated with specific function $n_{53}$ has the most matches to correct format. The process can then determine that an argument signature which when compared to the generic function call has the most matches is the most likely specific function intended by the user. Accordingly, this provides a best-fit with the error pattern and the error occurring at $Arg_4$ is the likely mode of failure. An associated error message can identify $Arg_4$ as the most likely cause of the error.

A more specific description of an example mode of error detection, analysis, and diagnosis can be articulated with respect to FIG. 1(a). Using the example of FIG. 1(a), the process compares the generic function call with the dummy arguments of the generic function definition to determine if the generic function call contains an error and then conduct a second sorting to identify an error analysis pattern that can be used to define and clarify the nature of the error. A first sorting is used on the generic function definition of FIG. 1(a). One approach for accomplishing this first sorting is to sort through each argument signature (e.g., all the dummy arguments for the argument signature) of the generic function definition one at a time until either it is determined that the generic function call is satisfactory or that an error is present. For example, the process compares the actual argument with the dummy argument associated with a signature corresponding to $n_1$, if the format of the generic function call does not agree with the format of the signature, the process proceeds to the next signature (i.e., the signature associated with $n_2$), and so until a format match is found. Where the actual arguments are found to correctly match the format for all of the dummy arguments for one signature, the generic function call is deemed to have a correctly matched format and not have an error. For example, if the generic function call contains an $Arg_1$ of having an ARRAY (integer) and no other parameters, the generic function call matches the format of the argument signature associated with specific function $n_1$. At this point the process would find no error in the generic function call and proceed to the next generic function call (e.g., Step 205) and look for errors there.

However, if the process, as it sorts through the arguments signatures (e.g., one after another, $n_1$ through $n_{14}$) and discerns no format matches between the generic function call and the signatures contained in the generic function definition then the process identifies that there is an error in the generic function call. The process then proceeds to evaluating the error in an effort to diagnose the cause of the error to the extent possible using the available information.

Once it has been determined that generic function call contains an error, the process evaluates the error pattern to determine more information about the mode of failure for the generic function call (Step 211). This can be referred to as determining the nature of the error. The nature of the error is used broadly in this patent. For example, it can describe the error in terms of the parameter(s) (arguments) having the error and the kind of error in the parameter. In case where there is ambiguity and the intention of the user cannot be determined, a more general (less specific) error message can be produced. As explained previously, where the generic function call does not match any of the argument signatures, it means the generic function call includes an error (Step 203). A second sorting through the dummy arguments of the generic function definition is then performed to analyze and diagnose the mode of failure the generic function call. The idea being that the second sorting is used to determine an error analysis pattern that can be used to clarify the failure mode for the generic function call. Such a pattern can be used to find the best fit of argument signature to the generic function call to narrow down the failure mode diagnosis.

A simplified illustrative description of such second sorting now follows. In one example, the user programmed generic function call that is being analyzed by the process has a format SUM (ARRAY(complex); DIM; MASK; MASK (scalar, logical). Thus, the generic function call is has an $Arg_1$ that is an array of type complex; an $Arg_2$ that is DIM; $Arg_3$ that is a MASK; and an $Arg_4$ that is a MASK of type logical and rank scalar. When sorting through the generic function definition of FIG. 1(a) a second time, additional information can be obtained. For example, starting with $Arg_1$ the generic function definition can be sorted. The $Arg_1$ of the generic function call is formatted as a complex array. Therefore, only signatures for $n_3$, $n_6$, $n_9$, $n_{12}$, $n_{13}$, $n_{14}$ match this format. The sorting continues through $Arg_2$. The signatures for $n_3$ and $n_9$ fail as to $Arg_2$ since a DIM is required. The sorting continues through $Arg_3$. The signature for $n_6$ fails because it does not contain a MASK for $Arg_3$ as does the generic function call. However, up to this point, the generic function call is valid as to $n_{12}$, $n_{13}$, and $n_{14}$. An analysis of the generic function call as to $Arg_4$ shows that $n_{12}$ fails for lack of a fourth parameter. However, the second sorting process identifies that both the signatures for $n_{13}$ and $n_{14}$ have the correct MASK function for $Arg_4$. The generic function call uses a MASK of type logical and rank scalar. Thus, as to the signature for $n_{13}$ the generic function call fails for having type real (instead of the required logical). But, as to the signature for $n_{14}$ the generic function call fails for having rank scalar (instead of the required array). Thus, from the second sorting it is determined that the signatures for $n_{13}$ and $n_{14}$ have the most correct argument matches. Additionally, $n_{13}$ and $n_{14}$ specify the correct parameter function (MASK) for $Arg_4$. However, the second sorting cannot determine the precise mode of failure at $Arg_4$. Thus, an example error message related to the generic function call can specify the error as identifying an erroneous SUM function with the probable mode of error at $Arg_4$. However, it cannot specify further detail.

This process can be performed for each generic function call in a specified piece of code. Each generic function call can be analyzed for the presence or errors. If no error is discovered the process simply moves on to the next generic function call until the entire desired portion of code is examined.

As errors are diagnosed, a second pass through an associated generic function definition (or table) can be performed. In another embodiment, each signature is sorted. Each signature is sorted, argument-by-argument until a mismatch is found, then the next signature is sorted. The $N^{th}$ argument is the highest dummy argument reached before the function fails. The error analysis can then be concentrated on the $N^{th}$ argument of each specific function. This second comparing of the $N^{th}$ parameter of the generic function call with the $N^{th}$ parameters of the dummy arguments can yield more detailed error information by looking for commonality between the mismatches. For example, if all of the $N^{th}$ arguments ($Arg_{Nth}$) for the generic function fail for the same reason (or if the $N^{th}$ argument does not exist for a particular specific function), the process can safely specify that mismatch reason on the $N^{th}$ argument as the reason for the generic function call error. In one example, if a generic function call specifies a first argument $Arg_1$ as ARRAY of rank 0, i.e. a scalar, all first arguments of the specific functions will not match with the generic function call and they will mismatch due to the rank (since they all expect rank 1 to 7). Thus, the evaluation can return error information precisely identifying the error as a "rank" error for $Arg_1$. This can be formatted as an error message in many different ways known to persons having ordinary skill in the art. In one non-limiting example, the error can be identified as an "incorrect rank on $Arg_1$".

Additionally, other kinds of error information can be discerned in accordance with embodiments of the invention. For example, if all the $N^{th}$ arguments ($Arg_{Nth}$) fail to match with the generic function call, but they mismatch for different reasons, a different kind of error message can be provided (e.g., error in $Arg_{Nth}$). This idea is demonstrated by the following example. For example, if there is a match as to the first argument $Arg_1$, then a second argument $Arg_2$ is evaluated. If the generic function call has two arguments and uses an array of type integer for $Arg_2$. In this case, $T_1$ and $T_4$ will fail due to incorrect number of arguments and we ignore those cases as not being intended to be called. The two remaining specific function templates $T_2$ and $T_3$ each fail to match for different reasons. $T_2$, which expects the second argument to be an integer scalar value DIM, fails due to the incorrect rank, whereas $T_3$, which expects the second argument to be a logical array MASK, fails due to incorrect type. The error information can be more general in this case although we still know which argument is incorrect. For example, the error information can simply specify that "$Arg_2$ is incorrect" without specifying the nature of the error. In more complicated cases where different arguments (parameters) result in mismatches for different specific functions, the error information can remain vague to avoid providing a misleading error message. For example, the message can state that "there are no matching specific functions".

Figure 3A:
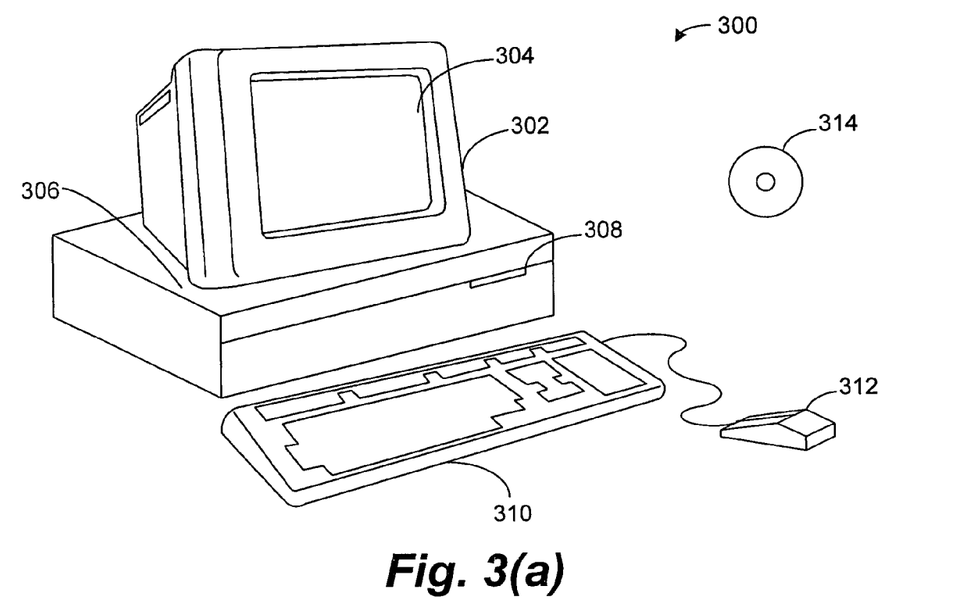
FIGS. 3A and 3B illustrate an embodiment of a computer system suitable for implementing embodiments of the present invention.
Figure 3B:
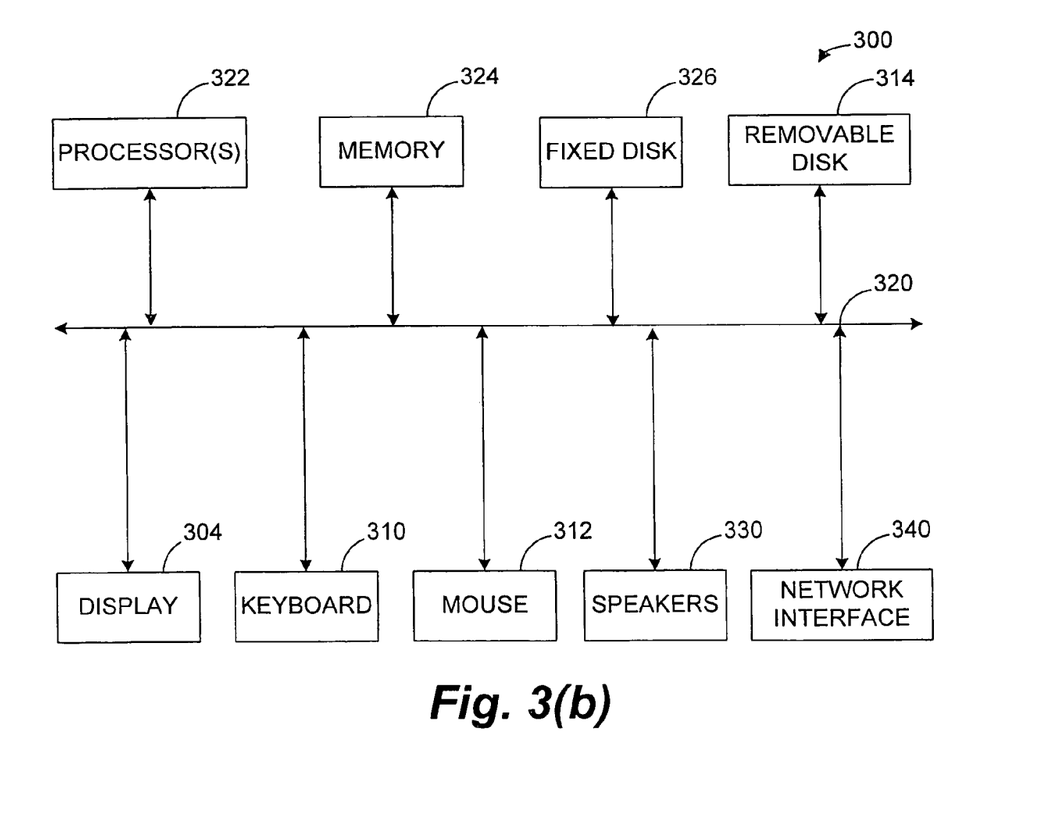

FIGS. 3A and 3B illustrate one example of a computer system 300, which forms part of the network that is suitable for implementing embodiments of the present invention. FIG. 3A shows one possible physical form of the computer system. Computer systems can take many physical forms ranging from an integrated circuit, a printed circuit board, and a small handheld device up to a high performance computing system. Additionally, computer systems are intended to apply to networked computer systems having many individual computers. Such networked systems can include local area networks (LAN's) or a wide area network (WAN's). An example of a LAN is a private network used by a mid-sized company with a building complex. Publicly accessible WAN's include the Internet, cellular telephone network, satellite systems and plain-old-telephone systems (POTS). Examples of private WAN's include those used by multi-national corporations for their internal information system needs. The network may also be a combination of private and/or public LANs and/or WANs.

An individual computer system 300 includes a monitor 302, a display 304, a housing 306, a disk drive 308, a keyboard 310, and a mouse 312. Disk 314 is a computer-readable medium used to transfer data to and from computer system 300.

FIG. 3B is an example of a block diagram for computer system 300. Attached to system bus 320 are a wide variety of subsystems. Processor(s) 322 (also referred to as central processing units, or CPUs) are coupled to storage devices, including memory 324. Memory 324 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 326 is also coupled bi-directionally to CPU 322; it provides additional data storage capacity and may also include any of the computer-readable media described below. Fixed disk 326 may be used to store programs, data, and the like and is typically a secondary storage medium (such as a hard disk) that is slower than primary storage. It will be appreciated that the information retained within fixed disk 326 may, in appropriate cases, be incorporated in standard fashion as virtual memory in memory 324. Removable disk 314 may take the form of any of the computer-readable media described below.

CPU 322 is also coupled to a variety of input/output devices, such as display 304, keyboard 310, mouse 312 and speakers 330. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 322 optionally may be coupled to another computer or telecommunications network using network interface 340. With such a network interface, CPU's receive information from the network, and are capable of outputting information to the network in the course of performing the above-described method steps. Furthermore, method embodiments of the present invention may execute solely upon CPU 322 or may execute over a network such as the Internet in conjunction with a remote CPU that shares a portion of the processing. Moreover, it is contemplated that one or more components of the computer system 300 may be located remotely and accessed via a network.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

The present invention has been shown and described with respect to certain embodiments and specific features thereof. However, it should be noted that the above-described embodiments are intended to describe the principles of the invention, not limit its scope. This specification concludes with claims that particularly point out and distinctly claim the subject matter which the inventor regards as his invention.

As is readily apparent to those of ordinary skill in the art, various changes and modifications in form and detail may be made without departing from the spirit and scope of the invention as set forth in the appended claims. Other embodiments and variations to the depicted embodiments will be apparent to those skilled in the art and may be made without departing from the spirit and scope of the invention as defined in the following claims. Further, reference in the claims to an element in the singular is not intended to mean "one and only one" unless explicitly stated, but rather, "one or more". Furthermore, the embodiments illustratively disclosed herein can be practiced without any element, which is not specifically disclosed herein.

The invention claimed is:

1. A method for detecting and analyzing errors in a generic function call comprising:
   providing a generic function call;
   providing a relation that includes sets of dummy arguments associated with the generic function call;
   first sorting through the relation to determine whether the generic function call contains errors;
   if the first sorting determines that the generic function call includes an error, second sorting through the relation to determine a failure mode for the generic function call; and
   providing an error message that identifies that the generic function call has an error and provides information about the failure mode of the generic function call as determined by the second sorting,
   wherein the relation comprises a matrix of argument signatures that relate the sets of dummy arguments with associated specific functions for the generic function, and
   wherein the generic function call comprises at least one argument and the first sorting through the relation comprises sorting and comparing each dummy argument of an argument signature with the least one argument of the generic function call until a parameter mismatch is determined for the dummy argument at which time the first sorting skips to a next argument signature and continues sorting and comparing the at least one argument of the generic function call with the dummy arguments of the next argument signature.

2. The method of claim 1 wherein the relation comprises a generic function definition table.

3. The method of claim 1 wherein the second sorting through the relation to determine the failure mode of the generic function call comprises:
   identifying which parameters of the generic function call contain errors; and wherein providing an error message comprises providing an error message that identifies which parameters contain errors in the generic function call.

4. The method of claim 3 wherein said second sorting further comprises clarifying the nature of the error to determine a type of error present in the parameter that contains errors; and wherein providing an error message comprises providing an error message that identifies which parameter contains the error and the type of error.

5. The method of claim 4 wherein clarifying the nature of the error to determine a type of error present in the parameter includes determining that the type of error is at least one of a rank error, a type error, and a kind error.

6. The method of claim 1 wherein the second sorting determines which argument signature has the most correct format matches with the generic function call; and
   wherein a mismatched parameter in the argument signature having the most correct format matches is identified as a parameter containing an error.

7. A method for detecting and analyzing errors in a generic function call constructed in accordance with a programming language protocol, the method comprising:
   providing a generic function call that can invoke a plurality of different specific functions which can be varied by selecting different parameters of the generic function call;
   determining whether the generic function call contains errors; and
   providing an error message that includes information about the failure mode that caused the errors in the generic function call,
   wherein determining whether the generic function call contains errors comprises:
      providing a relation that defines the generic function call in terms of sets of dummy arguments comprising argument signatures representative of specific functions defined for the generic function call,
      first sorting through the relation to compare the generic function call with the dummy arguments of the relation,
      where the generic function call correctly matches a format for one of the arguments signatures of the relation, the generic function call is deemed to have no error,
      where the generic function call does not correctly match a format for any of the arguments signatures, the generic function call is deemed to have an error,
      wherein identifying the nature of the errors comprises:
         recognizing that the first sorting has determined that an error is present in the generic function call;
         second sorting through the relation to determine if the failure mode in the generic function call can be further clarified, and
         wherein providing an error message comprises providing an error message that includes information about the failure mode determined by the second sorting,
   wherein the relation comprises a matrix of argument signatures that relate the sets of dummy arguments with associated specific functions for the generic function, and
   wherein the generic function call comprises at least one argument and the first sorting through the relation comprises sorting and comparing each dummy argument of an argument signature with the least one argument of the generic function call until a parameter mismatch is determined for the dummy argument at which time the first sorting skips to a next argument signature and continues sorting and comparing the at least one argument of the generic function call with the dummy arguments of the next argument signature.

8. The method of claim 7 wherein the relation comprises a generic function definition table.

9. The method of claim 7 wherein the second sorting through the relation to determine the failure mode of the generic function call comprises:
   identifying which parameters of the generic function call contain errors; and
   wherein providing an error message comprises providing an error message that identifies which parameters contain errors in the generic function call.

10. The method of claim 9 wherein said second sorting further comprises clarifying the nature of the error to determine a type of error present in the parameter that contains errors; and wherein providing an error message comprises providing an error message that identifies which parameter contains the error and the type of error.

11. The method of claim 10 wherein clarifying the nature of the error to determine a type of error present in the parameter includes determining that the type of error is at least one of a rank error, a type error, and a kind error.

12. The method of claim 7 wherein the second sorting determines which argument signature has the most correct format matches with the generic function call; and wherein a mismatched parameter in the argument signature having the most correct format matches is identified as a parameter containing an error.

13. A computer readable media including computer program code for detecting and analyzing errors in a generic function call, computer readable media comprising:
   computer code for providing a generic function call that can invoke a plurality of different specific functions which can be varied by selecting different parameters of the generic function call;
   computer code for determining whether the generic function call contains an error;
   computer code for identifying the nature of the error; and
   computer code for providing an error message that includes information about the failure mode that caused the error in the generic function call,
   wherein the code for determining whether the generic function call contains errors comprises:
      computer code for providing a relation that defines the generic function call in terms of sets of dummy arguments configured as arguments signatures representative of specific functions defined for the generic function call;
      computer code for first sorting through the relation to compare the generic function call with the dummy arguments of the relation;
      where the generic function call correctly matches a format for one of the argument signatures, the generic function call is deemed to have no error;
      where the generic function call fails to correctly match a format for any of the argument signatures, the generic function call is deemed to have an error;
      wherein the computer code for identifying the nature of the errors comprises:
         computer code for recognizing that the first sorting has determined that an error is present in the generic function call;
         computer code for second sorting through the relation to determine if the failure mode in the generic function call can be further clarified; and
         wherein the computer code for providing an error message includes code for providing an error message that includes information about the failure mode determined by the second sorting,
   wherein the relation comprises a computer readable matrix of arguments signatures that relate sets of dummy arguments with associated specific functions for the generic function call,
   wherein the computer code for first sorting through the relation comprises computer code for sorting and comparing the generic function call with the dummy arguments of each argument signature until a parameter mismatch is determined for a dummy argument of the signature at which time the computer code for first sorting skips to a next argument signature and continues sorting and comparing the generic function call with the next arguments signature.

14. The computer readable media of claim 13 wherein the relation comprises a computer readable generic function definition table for the generic function call.

15. The computer readable media of claim 13 wherein the computer code for second sorting through the relation to determine the failure mode of the generic function call comprises computer code for identifying which parameters of the generic function call contain errors; and wherein the computer code for providing an error message comprises computer code for providing an error message that identifies which parameters contain errors in the generic function call.

16. The computer readable media of claim 15 wherein said computer code for second sorting further comprises computer code for clarifying the nature of the error to determine a type of error present in the parameter that contains errors; and
   wherein computer code for providing an error message comprises computer code for providing an error message that identifies which parameter contains the error and the type of error.

17. The computer readable media of claim 16 wherein the computer code for clarifying the nature of the error to determine a type of error present in the parameter includes computer code for determining that the type of error is at least one of a rank error, a type error, and a kind error.

18. The computer readable media of claim 13 wherein the computer code for second sorting includes computer code for determining which argument signature has the most correct format matches with the generic function call;
   wherein the computer readable media includes computer code for identifying the argument signature having the fewest mis-matched parameters when compared with the generic function call;
   wherein computer readable media includes computer readable code for identifying which parameters are mis-matched and identifying those mis-matched parameters as the parameters containing errors; and
   wherein the computer code for providing an error message comprises computer code for providing an error message that identifies the mis-matched parameter as a parameter that contains an error.

* * * * *